United States Patent [19]
Nguyen

[11] Patent Number: 5,469,946
[45] Date of Patent: Nov. 28, 1995

[54] CLUTCH ACTUATION SYSTEM

[76] Inventor: Phuong H. Nguyen, 14752 Hunter La., Midway, Calif. 92655

[21] Appl. No.: 189,717

[22] Filed: Feb. 1, 1994

[51] Int. Cl.⁶ ..................................................... B60K 41/28
[52] U.S. Cl. .................... 192/3.58; 192/3.59; 192/85 C; 192/85 V; 192/91 R; 477/86; 477/89; 60/432; 91/508
[58] Field of Search .................... 192/3.58, 3.59, 192/3.62, 85 R, 85 C, 85 V, 91 R; 477/74, 86, 88, 89, 171; 60/425, 432, 486; 91/508

[56] References Cited

U.S. PATENT DOCUMENTS

| | | | |
|---|---|---|---|
| 2,765,893 | 10/1956 | Stuart . | |
| 3,303,912 | 2/1967 | Fujimoto et al. | 192/3.58 X |
| 3,379,291 | 4/1968 | Randol | 477/86 |
| 3,536,176 | 10/1970 | Cappa | 477/74 |
| 4,134,482 | 1/1979 | Polyak et al. | 192/91 R |
| 4,400,997 | 8/1983 | Fiala | 192/3.58 X |
| 4,488,625 | 12/1984 | Nobumoto et al. | 192/3.58 |
| 4,505,364 | 3/1985 | Goucher et al. . | |
| 4,533,030 | 8/1985 | Gabriel | 192/3.58 X |
| 4,967,884 | 11/1990 | Norica . | |
| 5,002,166 | 3/1991 | Leigh-Monstevens et al. . | |
| 5,031,735 | 7/1991 | Holmes . | |

*Primary Examiner*—Richard M. Lorence
*Attorney, Agent, or Firm*—Dennis W. Beech

[57] ABSTRACT

The clutch actuation system provides for control of the clutch of a manual transmission in a motor vehicle. By use of hydraulics, a vacuum booster and a gradual pressure relief valve a smooth easy control of the manual transmission is accomplished. The vacuum booster provides an assist to the hydraulic system when the clutch must be disengaged or engaged. The power assist facilitates rapid engagement of the clutch and gears. The gradual pressure relief valve provides for a smooth transition in the hydraulic system to engage and disengage the clutch. The rapid smooth assist is aided by the vacuum system of the motor vehicle. For certain motor vehicles the engine oil system is also used to assist.

9 Claims, 2 Drawing Sheets

CLUTCH ACTUATION SYSTEM

BACKGROUND OF THE INVENTION

1. Field of the Invention

This invention relates to devices used to engage and disengage the clutch of a motor vehicle having a manual gear control system. The new system provides a switch actuated hydraulic controlled method for smooth operation of the engagement and disengagement of the clutch. This system replaces the clutch pedal normally operated by a person's foot with a system that may be operated with a person's hand.

2. Description of Related Art

There are currently in use various types of devices and systems for actuating the clutch assembly of a manual transmission motor vehicle. The traditional method uses the clutch pedal mounted near the floor of the driver's side of the passenger compartment. The clutch pedal is linked to the clutch fork in the manual transmission by mechanical linkage. This allows for the driver to use his foot to engage and disengage the clutch assembly. The ease and smoothness with which such control is performed is dependant on the individual driver's ability to perform such a function.

The automatic transmission in a typical motor vehicle removes the gear shifting operation from the concern of the driver. Most automatic transmissions provide an easy, smooth transition between driving gears for the motor vehicle. However, typically the automatic transmission causes a greater expenditure of fuel than the typical manual transmission due to the engine power use associated with automatic transmissions.

In addition, various clutch control systems have been designed as an assist to the standard clutch pedal mechanisms for a standard transmission. Such systems include electrically controlled hydraulic pump and hydraulic actuators linked to the clutch pedal linkage. Systems which are linked to the gear shift lever of a motor vehicle and utilize hydraulic systems of pumps and actuators also exist in the art.

The present invention combines the use of a switch controlled hydraulic actuated system with the vacuum system of the motor vehicle to provide for easy, smooth manual transmission clutch operation. By means of a gradual pressure release valve and other hydraulic design a smooth engagement of the clutch assembly is achieved. The hydraulic system may be powered from the engine belt driven system using an electric clutch or by an electric motor.

SUMMARY OF THE INVENTION

A primary objective of the present invention is to provide a switch controlled, hydraulic actuated system for engaging and disengaging the clutch of a manual transmission used with motor vehicles. An additional objective is to utilize the motor vehicle vacuum system to provide such clutch operation in a smooth, efficient manner. A further object is to use the engine oil system of the motor vehicle to assist the clutch operation in those vehicles which do not have a sufficient vacuum system for assisted operation.

In accordance with the description presented herein, other objects of this invention will become apparent when the description and drawings are reviewed.

DESCRIPTION OF THE PREFERRED EMBODIMENT

The clutch actuation system consists of a hydraulic control system with driver unit, pump, valves, cylinder actuator and vacuum booster attached to the clutch fork of a clutch assembly in a motor vehicle having a manual transmission. Various elements of the hydraulic control system are connected to the motor vehicle engine vacuum system to assist the operation of the hydraulic system to provide a smooth transition in engaging the clutch assembly. The clutch actuation system is switch controlled electrically to allow for clutch operation by use of a person's hand or foot.

Figure 1:
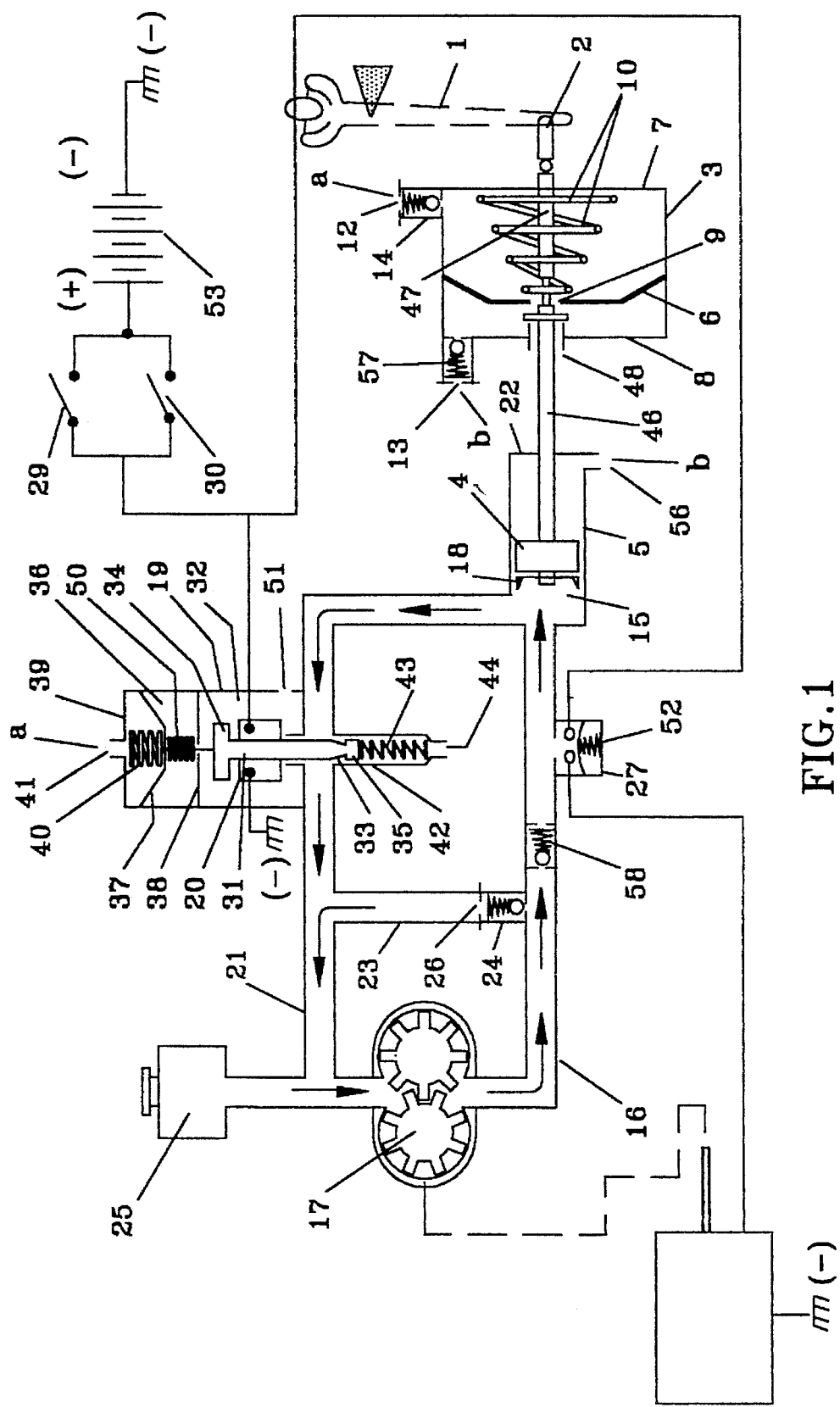
FIG. 1 is a schematic of the clutch actuation system.

Referring to FIG. 1, the clutch fork (1) is connected to the clutch fork rod (2) which is linked to the push rod (47) in the vacuum booster (3). While the clutch fork rod (2) is diagramed as a rod pushing against the clutch fork (1) in FIG. 1, the linkage may be arranged such that a cable may be used which pulls the clutch fork (1) by operation of the push rod (47).

The push rod (47) in the vacuum booster (3) is linked to the valve rod (46) which extends through the vacuum booster (3) to the piston (4) in the hydraulic actuator (5). The vacuum booster (3) has an assist unit pressure diaphragm (6) therein intermediate a clutch side (7) and actuator side (8) through which the valve rod (46) extends. The assist unit pressure diaphragm (6) has a vacuum passage (9) which may be opened and closed by the valve rod (46).

The vacuum booster (3) also has an assist vacuum port (12) with a check valve (14) connected to the engine intake manifold (61) and relief vacuum port (13) with relief check valve (57) connected to a weak engine vacuum source such as near the engine air filter (62). Assist vacuum port (12) creates a strong vacuum in the vacuum booster (3) when the clutch is engaged and the valve rod (46) is located furthest from the clutch side (7). The vacuum created through assist vacuum port (12) exists on the clutch side (7) and actuator side (8) through vacuum passage (9).

When the valve rod (46) is forced toward the clutch side (7) the valve rod (46) closes the vacuum passage (9) and opens the atmosphere port (48) thus allowing atmospheric pressure into the assist side (8) of the vacuum booster (3). This pressure differential helps push the clutch fork (1) to disengage the clutch by applying force to the push rod (47) much as a power brake assist unit on an automobile brake system operates. The relief check valve (57) maintains the atmospheric pressure at low engine speeds due to the weak vacuum. As the engine operates at higher speeds the vacuum at the relief vacuum port (13) is increased such that relief check valve (57) allows the atmospheric pressure in the vacuum booster (3) to escape making it easier for the diaphragm to be moved toward the assist side (8). When the fluid pressure on the valve rod (46) is released the diaphragm return spring (10) pushes the assist unit pressure diaphragm (6) toward the assist side (8). At high engine speed or rpm with a vacuum on assist side (8) of the vacuum booster (3) the movement is faster thereby assisting in fast clutch engagement at high engine rpm.

The hydraulic actuator (5) is connected at a hydraulic end (15) to a hydraulic control system. The pressure side of the system has a pressure line (16) connected to a fluid pump (17) and to the hydraulic actuator (5). When the driver unit (28) is powered to activate the fluid pump (17) it creates fluid pressure against the piston (4) in the hydraulic actuator (5). The piston (4) has a seal (18) to prevent the flow of fluid around the piston (4). The hydraulic actuator (5) also has an actuator vacuum port (56) to create a vacuum at the actuated end (22) to assist the movement of the piston (4) when hydraulic pressure is applied.

At the same time the fluid pump (17) is operated the gradual pressure relief valve (19) is closed in the relief line (21) by the solenoid (20). While the fluid pump (17) is operated the hydraulic pressure increases to the point the piston (4) is moved toward the actuated end (22) of the hydraulic actuator (5). When the piston (4) is moved sufficiently toward the actuated end (22), the clutch of the motor vehicle is disengaged by the clutch fork (1). Once the piston (4) has moved toward the actuated end (22) to disengage the clutch, the continued pressure increase due to the fluid pump (17) operation is discontinued by limit switch (27).

Once proper pressure is established to maintain the piston (4) at the actuated end (22), the limit switch (27) is opened to disconnect the electric source (53) from the driver unit (28) driving the fluid pump (17). Should there be any leakage such that the pressure against the piston (4) decreases, the limit switch (27) will close by action of limit switch spring (52) to supply power to the driver unit (28). A pressure check valve (58) in pressure line (16) prevents back flow of hydraulic fluid when the fluid pump (17) is not operating.

The driver unit (28) and solenoid (20) are powered by the electric source (53) when either the brake pedal switch (29) or gear shift handle switch (30) are closed in the electrical circuit. When the limit switch (27) opens to disconnect electric power to the driver unit (28), the clutch will stay disengaged as long as solenoid (20) is activated.

The clutch activation system allows the clutch to engage when the brake pedal switch (29) and gear shift handle switch (30) are open. This normally occurs when the driver releases the brake and/or the gear shift handle switch (30). In this open position the electric source (53) is disconnected from the driver unit (28) and the solenoid (20).

Figure 2:
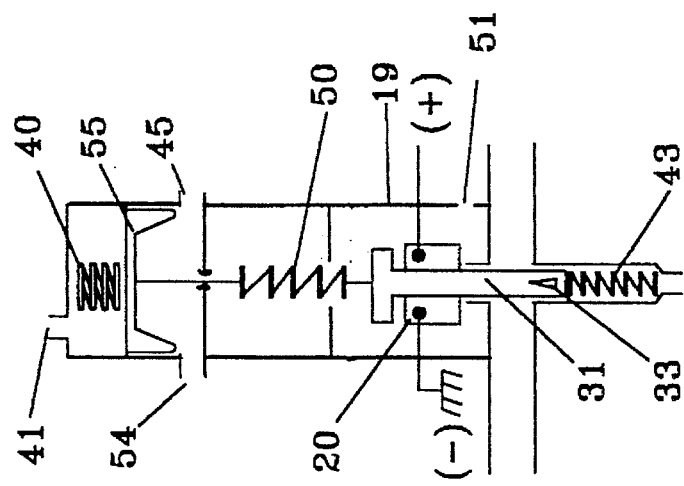
FIG. 2 is schematic of the gradual pressure release value using the engine oil system.

The gradual pressure relief valve (19) has a relief piston (31) extending from the lower valve chamber (32) through the relief line (21). The relief piston (31) passes through the solenoid (20). The relief piston (31) has a tapered section (33) intermediate the limit end (34) and the flow end (35) which tapered section (33) is the length of the diameter of the relief line (21). The tapered section (33) may be circumferential to the relief piston (31) as shown in FIG. 1 or internal to the relief piston (31) as shown in FIG. 2.

The gradual pressure relief valve (19) has a lower valve chamber (32) and upper valve chamber (36). The upper valve chamber (36) has a chamber diaphragm (37) intermediate the chamber separator (38) and the upper valve chamber end (39). The relief piston (31) limit end (34) is connected to the chamber diaphragm (37) by a strong linkage spring (50). There is a relief spring (40) between the chamber diaphragm (37) and the upper valve chamber end (39) to create a force to generally separate the chamber diaphragm (37) and the upper valve chamber end (39).

The upper valve chamber end (39) also has a chamber vacuum port (41) connected to the motor vehicle vacuum system such as at the engine intake manifold to create a vacuum relative to ambient pressure in the remainder of the upper valve chamber end (39). This pressure differential tends to open the gradual pressure relief valve (19) by the chamber diaphragm (37) pulling on the relief piston (31) connected by linkage spring (50).

In the closed position the relief piston (31) limit end (34) is pulled against the solenoid (20). At engine idle speeds the gradual pressure relief valve (19) is closed whether or not the solenoid (20) is activated. At engine idle speeds a weak vacuum is created in the upper valve chamber end (39) which allows idle spring (40) to push the chamber diaphragm (37) away from the upper valve chamber end (39). This in turn pushes linkage spring (50) against the relief piston (31) which closes the relief line (21).

If engine rpm is increased, the vacuum increases in the upper valve chamber end (39). If the solenoid (20) is deactivated, the increased vacuum allows the atmospheric pressure via atmospheric aperture (51) to push the chamber diaphragm (37) toward the upper valve chamber end (39) against relief spring (40) which in turn draws the linkage spring (50) and relief piston (31) toward the upper valve chamber end (39). This moves the relief piston (31) into the open position and allows hydraulic fluid to flow in the relief line (21). This all occurs when switches (29) and (30) are open and the driver accelerates the engine. This increases the vacuum and the springs (40) and (50) provide for a gradual smooth engagement of the clutch. The chamber separator (38) limits the movement of the relief piston (31) when the limit end (34) contacts the chamber separator (38).

At high engine rpm the vacuum in upper valve chamber end (39) is increased which allows atmospheric pressure via atmospheric aperture (51) to push the chamber diaphragm (37) toward the upper valve chamber end (39) against relief spring (40). However, if solenoid (20) is activated, the linkage spring (50) allows the solenoid (20) to hold the relief piston (31) in the closed position and keep the clutch disengaged.

During the condition of the vehicle traveling at speed in gear the disengagement of the clutch is caused when the brake pedal switch (29) or gear shift handle switch (30) are closed by action of the driver. The solenoid (20) is activated and the relief piston (31) is pulled away from the chamber separator (38). This will occur even if the chamber diaphragm (37) is at its closest point to the upper valve chamber end (39) as linkage spring (50) allows the relief piston (31) to move. The solenoid (20) causes the relief piston (31) to move to close the relief line (21). Hydraulic pressure increases as the driver unit (28) is activated to power fluid pump (17) which pumps fluid from fluid reservoir (25) and the clutch is disengaged as described before.

The relief piston (31) flow end (35) is mounted in the open chamber (42) containing open spring (43) to cushion the impact of the limit end (34) contact with solenoid (20) as the relief piston (31) is moved. The open chamber (42) has an open atmospheric port (44) to prevent pressure build up as the relief piston (31) is moved.

Figure 4:
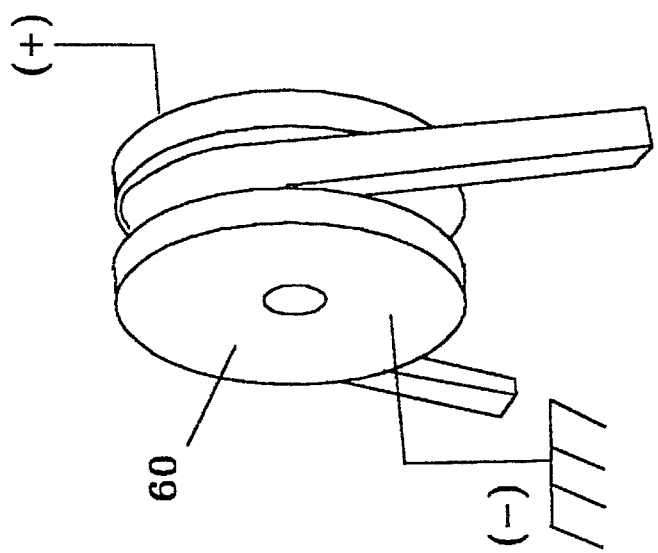
FIG. 4 illustrates an alternate driver unit for the clutch actuation system.
Figure 3:
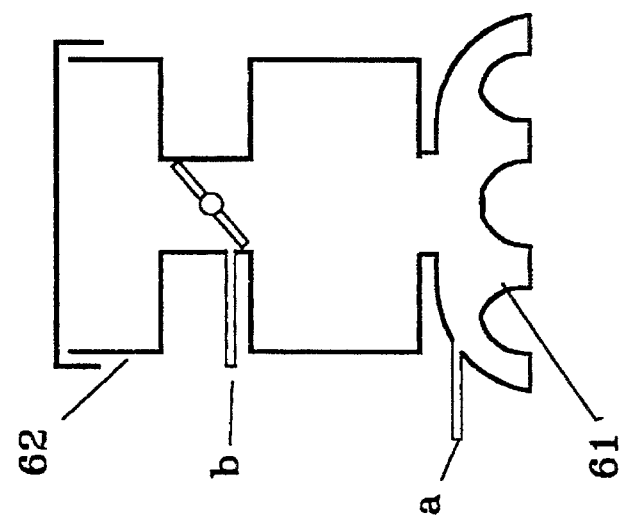
FIG. 3 illustrates a schema of the vacuum source for the clutch actuation system.

The safe valve line (23) provides additional protection to the system should the limit switch (27) fail to operate. In an emergency case of pressure build up, the safe check valve (24) will open against safe check spring (26) to release hydraulic pressure build up if the driver unit (28) is not disconnected by the limit switch (27) from the electric unit (53) at the proper pressure. The driver unit (28) may be an electric motor as illustrated in FIG. 1 or alternatively may be an engine belt driven unit (60) with an electric clutch as illustrated in FIG. 4.

Referring to FIG. 2, a gradual pressure relief valve (19) uses the engine oil system for assist rather than the engine vacuum system. On some automobile engines the vacuum system is too weak to provide the necessary pressure differential. In this embodiment the engine oil pressure is applied at inlet oil port (45) and released at outlet oil port (54). The engine oil fluid applies pressure against diaphragm piston (55) which tends to push the diaphragm piston (55) toward the upper valve chamber end (39). As described earlier with chamber vacuum port (41) the variation in vacuum created by the engine rpm allows the diaphragm piston (55) to move to assist in movement of relief piston (31).

I claim:

1. A control system for controlling a clutch of a motor vehicle having a manually operated transmission and further having an electric power source, comprising:

a vacuum booster having a clutch fork rod attached to a motor vehicle clutch fork and attached to a push rod which push rod passes through a clutch side into the vacuum booster;

a valve rod attached to the push rod which valve rod passes through an actuator side of the vacuum booster and is attached to a piston having a seal in a hydraulic actuator;

an assist unit pressure diaphragm in the vacuum booster intermediate the clutch side and the actuator side wherein the assist unit pressure diaphragm has a vacuum passage therein;

a diaphragm return spring between the clutch side and the assist unit pressure diaphragm;

a vacuum port having a check valve on the clutch side and a relief vacuum port having a relief check valve on the actuator side wherein the vacuum port vacuum source is a stronger vacuum relative to the relief vacuum port vacuum source;

an atmospheric port operated by movement of the valve rod on the actuator side;

the hydraulic actuator with an actuated end having an actuator vacuum port connected to the vacuum source and a hydraulic end connected to a pressure line and a relief line with a safe valve line connected between the pressure line and the relief line;

the pressure line connected to a fluid pump and having a pressure check valve intermediate the safe valve line and the hydraulic end;

a limit switch with a limit switch spring in the pressure line;

the relief line and the fluid pump connected to a fluid reservoir with the relief line having a gradual pressure relief valve intermediate the safe valve line and the hydraulic end;

a safe check valve with a safe check valve spring in the safe check line;

a driver unit to power the fluid pump;

an electric source electrically connected to a brake pedal switch and a gear shift handle switch in parallel which are connected to a solenoid and the limit switch which limit switch is electrically connected to the driver unit.

2. The control system as in claim 1 wherein the driver unit is an electric motor.

3. The control system as in claim 1 wherein the driver unit is an engine belt driven unit with an electric clutch.

4. The control system as in claim 1 wherein the gradual pressure relief valve comprises:

a relief piston in a lower valve chamber having an atmospheric aperture therein passing through a solenoid with a limit end and with a flow end in an open chamber;

the limit end attached to a linkage spring passing through a chamber separator and attached to a chamber diaphragm in an upper valve chamber;

the chamber diaphragm attached to a relief spring which is attached to an upper valve chamber end;

the upper valve chamber end having a chamber vacuum port defined therein and attached to the vacuum source;

the relief piston having a tapered section intermediate the limit end and the flow end; and the open chamber having an open spring and an open atmospheric port.

5. The control system as in claim 1 wherein the gradual pressure relief valve comprises:

a relief piston in a lower valve chamber having an atmospheric aperture therein passing through a solenoid with a limit end and with a flow end in an open chamber;

the limit end attached to a linkage spring passing through a chamber separator and attached to a diaphragm piston in an upper valve chamber having an inlet oil port and an outlet oil port;

the diaphragm piston attached to a relief spring which is attached to an upper valve chamber end;

the upper valve chamber end having a chamber vacuum port defined therein and attached to the vacuum source;

the relief piston having a tapered section intermediate the limit end and the flow end; and the open chamber having an open spring and an open atmospheric port.

6. A control system for controlling a clutch of a motor vehicle having a manually operated transmission and further having an electric power source, comprising:

a vacuum booster means attached to a motor vehicle clutch fork and attached to a piston having a seal in a hydraulic actuator;

the hydraulic actuator with an actuated end having an actuator vacuum port connected to a vacuum source and a hydraulic end connected to a pressure line and a relief line with a safe valve line connected between the pressure line and the relief line;

the pressure line connected to a fluid pump and having a pressure check valve intermediate the safe valve line and the hydraulic end;

a limit switch with a limit switch spring in the pressure line;

the relief line and the fluid pump connected to a fluid reservoir with the relief line having a gradual pressure relief valve intermediate the safe valve line and the hydraulic end;

a safe check valve with a safe check valve spring in the safe check line;

a driver unit to power the fluid pump;

an electric source electrically connected to a brake pedal switch and a gear shift handle switch in parallel which are connected to a solenoid and the limit switch which limit switch is electrically connected to the driver unit.

7. The control system as in claim 6 wherein the driver unit is an electric motor.

8. The control system as in claim 6 wherein the driver unit is an engine belt driven unit with an electric clutch.

9. The control system as in claim 6 wherein the gradual pressure relief valve comprises:

a relief piston in a lower valve chamber having an atmospheric aperture therein passing through a solenoid with a limit end and with a flow end in an open chamber;

the limit end attached to a linkage spring passing through a chamber separator and attached to a chamber diaphragm in an upper valve chamber;

the chamber diaphragm attached to a relief spring which is attached to an upper valve chamber end;

the upper valve chamber end having a chamber vacuum port defined therein and attached to the vacuum source;

the relief piston having a tapered section intermediate the limit end and the flow end; and the open chamber having an open spring and an open atmospheric port.

* * * * *